Patented Dec. 25, 1951

UNITED STATES PATENT OFFICE 2,580,205

BLACK PRINTING INKS

Andries Voet, New York, N. Y., assignor, by mesne assignments, to J. M. Huber Corporation, New York, N. Y., a corporation of New Jersey No Drawing. Application October 2, 1946, Serial No. 700,827

7 Claims. (Cl. 106—23)

This invention relates to improvements in black printing inks containing fugitive coloring matter.

In the manufacture of black printing inks, carbon black is dispersed in oily vehicles containing water-immiscible liquid, such as mineral or non-mineral oil, in which resinous or waxy binders or thickeners may have been incorporated. The inks resulting from this generally exhibit an objectionable brownish shade, and it is customary to improve them by adding blue or purple coloring material, in order to obtain prints having a purer and denser black color.

For certain inks this procedure is carried out by the addition of purple or blue pigments. That practice, however, is expensive; so much so that the lowest priced inks and various others are treated with oil-soluble dyes. The most common soluble colors are derived from basic dyes, such as methyl violet base, Victoria Blue base, Induline Blue and Nigrosine Black, by combining them with organic acid radicals such as those of fatty acids like oleic acid, stearic acid, lauric acid, etc., to obtain oil-soluble dye salts. These soluble dye salts are considerably more effective in equal quantity by weight than the insoluble pigments but they present a considerable disadvantage in their lack of permanence.

Thus, it is well known that printing inks made with oil-soluble dyes suffer a progressive decrease of coloring effect as the inks become aged. This is often described as the "burning out" or fading of color. It is especially prevalent in news inks, but it occurs also in other liquid inks colored with soluble dyes. Sometimes the entire effect is eliminated in a matter of a few weeks, or even days, which involves a considerable economic loss that the art has been unable satisfactorily to avoid.

An object of this invention is to provide printing inks colored with soluble dyes which retain their effect for comparatively long periods of time. Another object is to provide such inks which show an increased effect for a given quantity of added dyestuff; and a further object is to provide durably colored black printing inks which have excellent printing characteristics and are inexpensive to manufacture.

I have discovered that these objects can be achieved by making black printing inks, comprising any suitable dispersion of carbon pigment in a liquid vehicle containing water-immiscible liquid such as mineral or vegetable oil, so that they contain small quantities of oil-soluble zinc salts in conjunction with oil-soluble dyestuffs. Oil-soluble zinc salts as a class have been found effective according to this discovery, while zinc naphthenate, zinc resinate, zinc oleate and zinc 2-ethyl hexoate, and especially the first named, are examples of those which I have found to be the most effective.

When a printing ink colored with an oil-soluble dye salt is modified by the presence of as little as 0.2 per cent by weight of such an oil-soluble zinc salt, a pronounced reduction in the fading is obtained. My invention is believed to obviate the objectionable fading heretofore experienced, through the formation of oil-soluble complexes between the zinc salt and the dyestuff which preserve the effect of the dyestuff. Whatever may be its exact explanation, the effect of my invention appears to be peculiar to the use of oil-soluble zinc salts with soluble dyes, as herein set forth.

The quantity of zinc salt preferably used is smaller with a low concentration of dye and higher with a higher concentration of dye, and varies usually between 0.2 and 2.0 per cent by weight. Quantities above 2 per cent usually show no marked improvement over the 2 per cent addition, while quantities below 0.2 per cent do not show the full benefit, even with smaller quantities of dyestuff.

The inks embodying this invention preferably are prepared by incorporating the oil-soluble zinc salt into a printing ink, either during or just after milling in the carbon pigment, and thereafter adding and well mixing a solution containing the soluble dyestuff; but the improved inks can be prepared by adding the dye first or in other ways.

The following examples are illustrative of my invention. All proportions in the examples are given by weight.

Example 1.—News ink

To a news ink made by incorporating 12 parts of carbon black into 88 parts of a vehicle consisting of 99 parts of mineral oil and 1 part of gilsonite, was added 1 part of zinc naphthenate (8% zinc content), after which was added 1 part of a 25 per cent solution of methyl violet base in oleic acid. A second portion of the same ink was treated in the same way, but without the addition of zinc naphthenate. The effect of the dye in this latter ink had almost disappeared in 7 days, while the effect in the ink containing zinc naphthenate was not reduced to the same condition after 90 days.

Example 2.—News ink

To a news ink made by incorporating 10 per cent of carbon black into a vehicle containing 98 parts of mineral oil and 2 parts of rosin oil was added 1 part of zinc resinate (8 per cent zinc) dissolved in 3 parts of mineral oil, after which was added 1 part of a 25 per cent solution of Victoria Blue base in oleic acid. The effect of the dye in the treated ink was still fairly strong after 60 days, while in 7 days the effect had practically disappeared from an ink containing no zinc resinate but otherwise the same.

Example 3.—Half-tone ink

A half-tone ink was prepared as follows, by milling the following materials together:

| | Parts |
|---|---|
| Carbon black | 19 |
| Linseed varnish (40 poises) | 77 |
| Petrolatum | 2 |
| Cobalt drier | 2 |

To this ink was added 1 per cent of zinc linoleate and 1 part of a 25 per cent solution of methyl violet base dissolved in lauric acid, resulting in an ink having excellent printing characteristics which still retained practically the original dye effect after 30 days. An ink containing no zinc linoleate but otherwise identical had lost most of the effect in 7 days.

*Example 4.—Heat-set ink*

A printing ink was prepared as follows, by heating and milling the following materials together:

| | Parts |
|---|---|
| Rosin modified phenolic resin | 40 |
| Hydrocarbon solvent, boiling range 470°–520° F. | 43 |
| Carbon black | 16 |
| Paraffin wax | 1 |

To this ink was added 1 per cent of zinc 2-ethyl hexoate and, afterwards, 1 part of a 25 per cent solution of methyl violet base in oleic acid, resulting in a durably colored heat-set ink having excellent printing qualities.

Various oil-soluble zinc salts and oil-soluble dyes other than those referred to in the examples may be used together in the improved inks. While oil-soluble zinc salts as a class appear to be effective in preventing dye deterioration, some zinc salts, such as zinc stearate, in higher concentration, have the tendency to promote the formation of false body in printing inks, which is undesirable. Some others, such as zinc resinate, provide excellent working characteristics but cannot be easily incorporated into the ink by a direct mixing procedure, due to their high melting point. In cases such as this the zinc salt is incorporated into the ink as a varnish, by first dissolving it in oil.

The zinc salt which I now consider to be the most advantageous for this invention is zinc naphthenate, largely because it is so easily mixed into an ink or ink vehicle. Zinc 2-ethyl hexoate also has excellent qualities for this purpose.

It is to be understood that the details set forth hereinabove are exemplary and that the principles of the disclosed invention may be practiced by the use of various other ink dispersions, oil-soluble dyes and oil-soluble zinc salts within the scope of the appended claims.

I claim:

1. A black printing ink composed essentially of insoluble carbon pigment dispersed in a water immiscible liquid ink vehicle together with a solution of a toning oil-soluble dyestuff in an oil-soluble higher fatty acid and a small amount, at least about 0.2% of the ink weight, of an oil-soluble carboxylic acid zinc salt preserving the coloring effect of said dyestuff, the carbon pigment constituting nearly all the ink coloring matter and said dyestuff being present in a relatively minute amount sufficient to tone the ink color.

2. A black printing ink composed essentially of insoluble carbon pigment dispersed in a water immiscible liquid ink vehicle together with a solution of a toning oil-soluble fatty acid salt of basic dye in an oil-soluble higher fatty acid and a small amount, at least about 0.2% of the ink weight, of an oil-soluble carboxylic acid zinc salt preserving the coloring effect of said dye salt, the carbon pigment constituting nearly all the ink coloring matter and said dye salt being present in a relatively minute amount sufficient to tone the ink color.

3. A black printing ink composed essentially of insoluble carbon pigment dispersed in a water immiscible liquid ink vehicle together with a solution of an oil-soluble dyestuff in an oil-soluble higher fatty acid and about 0.2 to 2%, based on ink weight, of an oil-soluble carboxylic acid zinc salt preserving the coloring effect of said dyestuff, the carbon pigment constituting nearly all the ink coloring matter and said dyestuff being present in a relatively minute amount sufficient to tone the ink color.

4. A black printing ink composed essentially of insoluble carbon pigment dispersed in a water immiscible liquid ink vehicle together with a solution of a toning oil-soluble fatty acid salt of basic dye in an oil-soluble higher fatty acid and about 0.2 to 2%, based on ink weight, of an oil-soluble carboxylic acid zinc salt preserving the coloring effect of said dye salt, the carbon pigment content being at least about 10% of the ink weight and the content of said dye salt being relatively minute but sufficient to tone the ink color.

5. A black printing ink composed essentially of insoluble carbon pigment dispersed in a water immiscible liquid ink vehicle together with a solution of a toning oil-soluble basic dye in oleic acid and about 0.2 to 2%, based on ink weight, of zinc naphthenate preserving the coloring effect of said dye salt, the carbon pigment content being at least about 10% of the ink weight and the content of said dye salt being relatively minute but sufficient to tone the ink color.

6. A black printing ink composed essentially of insoluble carbon pigment dispersed in a water immiscible liquid ink vehicle together with a solution of a toning oil-soluble basic dye in oleic acid and about 0.2 to 2%, based on ink weight, of zinc resinate preserving and coloring effect of said dye salt, the carbon pigment content being at least about 10% of the ink weight and the content of said dye salt being relatively minute but sufficient to tone the ink color.

7. A black printing ink composed essentially of insoluble carbon pigment dispersed in a water immiscible liquid ink vehicle together with a solution of a toning oil-soluble basic dye in oleic acid and about 0.2 to 2%, based on ink weight, of zinc 2-ethyl hexoate, preserving the coloring effect of said dye salt, the carbon pigment content being at least about 10% of the ink weight and the content of said dye salt being relatively minute but sufficient to tone the ink color.

ANDRIES VOET.

REFERENCES CITED

The following references are of record in the file of this patent:

UNITED STATES PATENTS

| Number | Name | Date |
|---|---|---|
| 342,207 | Jacobs | May 18, 1886 |
| 437,780 | Higgins | Oct. 7, 1890 |
| 619,889 | Hochstetter | Feb. 21, 1899 |
| 741,734 | Spohn | Oct. 20, 1903 |
| 1,487,873 | Marston | Mar. 25, 1924 |
| 2,097,773 | Orelup | Nov. 2, 1937 |
| 2,157,767 | Long | May 9, 1939 |
| 2,236,296 | Munich | Mar. 25, 1941 |
| 2,390,102 | Jenck | Dec. 4, 1945 |
| 2,406,878 | Whyzmusis | Sept. 3, 1946 |